Sept. 18, 1956 W. W. SCOTT ET AL 2,763,093
RODENT FEEDER
Filed Nov. 30, 1953 2 Sheets-Sheet 1
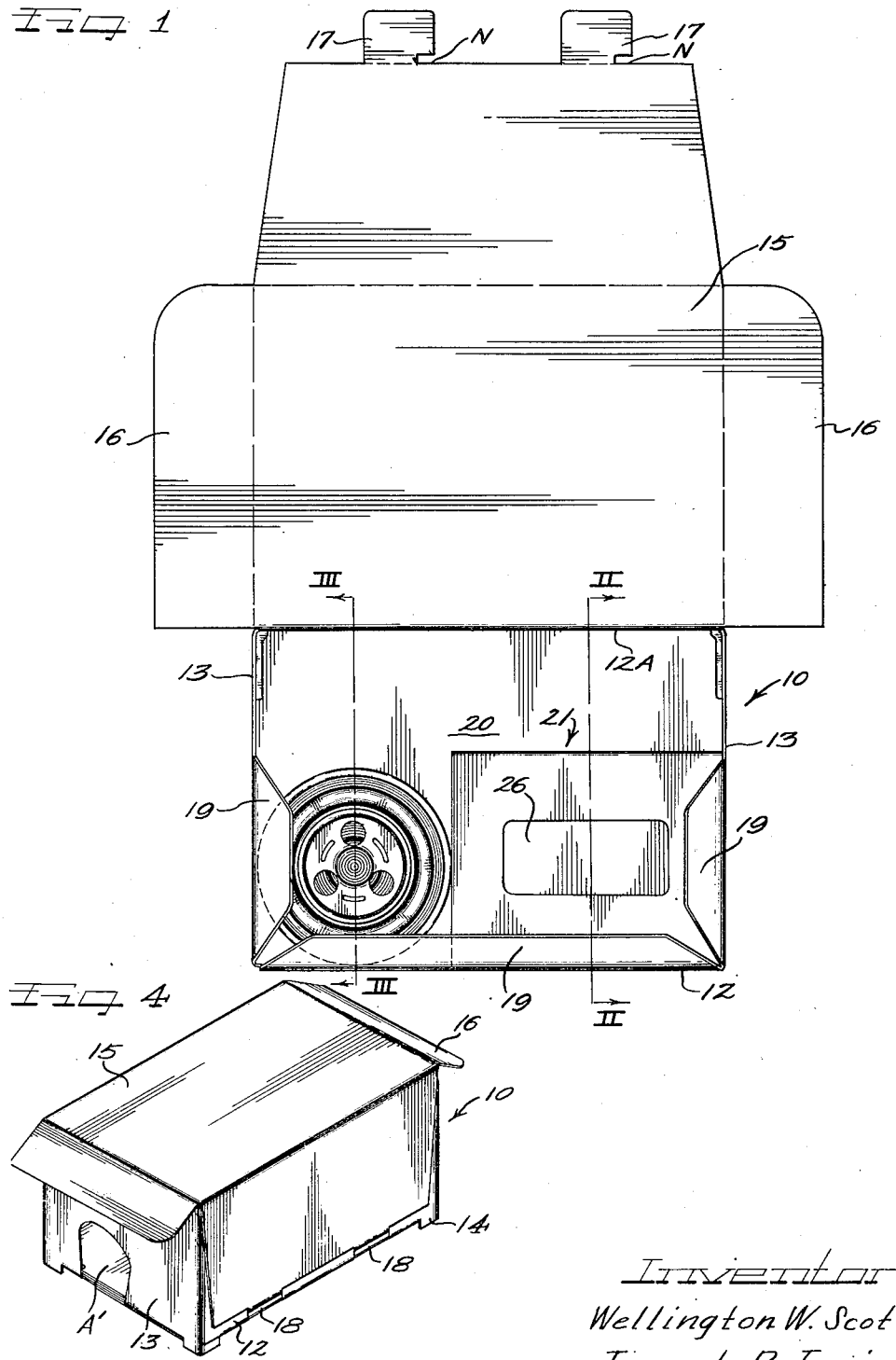
Inventor
Wellington W. Scott
Joseph P. Irvine

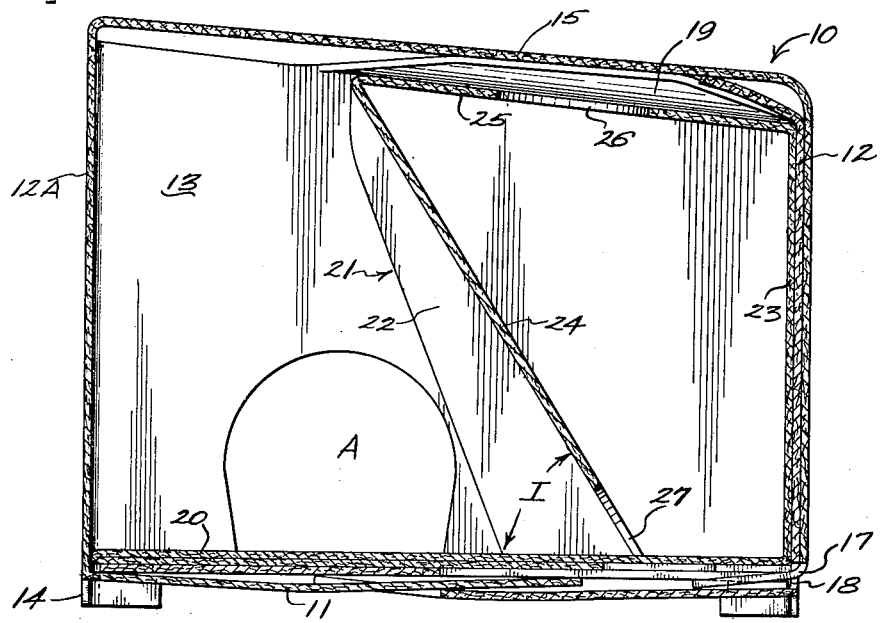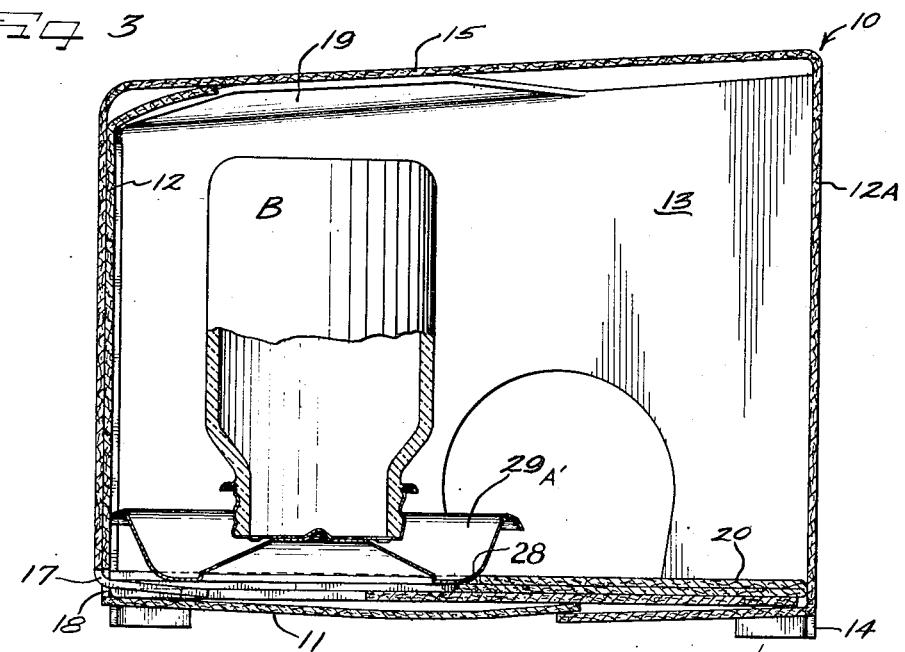

United States Patent Office 2,763,093
Patented Sept. 18, 1956

2,763,093

RODENT FEEDER

Wellington W. Scott and Joseph P. Irvine, Waukegan, Ill., assignors to Arwell, Inc., Waukegan, Ill., a corporation of Illinois Application November 30, 1953, Serial No. 394,940

4 Claims. (Cl. 43—131)

The present invention relates to a new and improved type of rodent feeder for automatically dispensing rodenticidal compositions.

More particularly it relates to a new and improved, inexpensive and disposable type of rodent feeder for dispensing both dry, particulated rodenticides and liquid rodenticides, and which is substantially tamper-proof.

Accordingly, an object of the instant invention is to provide a new and improved type of rodent feeder for dispensing rodenticides.

Another object is to provide an inexpensive and disposable article for the extermination of rodents.

Another object is to provide an inexpensive disposable rodent feeder which will dispense both dry and liquid rodenticides.

Other objects and advantages of the instant invention will be apparent from the following discussion of the annexed sheet of drawings.

In the drawings:

Figure 1 is a top plan view of the instant rodent feeder with the cover in an open position;

Figure 2 is a cross-sectional view taken along line II—II of Figure 1 with the cover in a closed position;

Figure 3 is a cross-sectional view of Figure 1 similar to Figure 2 but taken along line III—III; and Figure 4 is a perspective view of the instant rodent feeder with the cover in a closed and locked position.

As shown in the drawings:

The rodent feeder of the instant invention comprises a generally box-shaped receptacle shown generally at 10 having a rectangular bottom portion 11, parallel opposed side walls 12 and 12A and parallel opposed end walls 13. The end walls 13 have generally semi-circular openings or apertures A and A' therethrough for permitting the ingress and egress of rodents from the receptacle 10. The side and end walls at the corners of the rectangular bottom portion 11 have extensions 14 which act as legs to support the rodent feeder and elevate same above a flat surface upon which it may be placed. A cover member 15 is provided for sealing the receptacle. This cover member 15 is hingeably engaged to the top edge of one of the side walls 12A. When in a closed position, the cover member 15 encloses the top of the receptacle 10 and covers the side wall 12 opposite the side wall 12A upon which side cover member is hingeably engaged. Handle flaps or leaves 16 are provided and project laterally from the cover member 15 to provide means for lifting and moving the rodent feeder when in use.

Retaining or locking tabs 17 are provided on the free end edge of the cover member for locking the cover member 15 in a closed position. As may best be seen in Figures 1, 2, 3 and 4 the locking tabs 17 have a notch N which engages the opposite side wall 12 when said tabs are introduced into the slit-like apertures 18 provided adjacent the bottom of said opposite side wall 12 for receiving said locking tabs 17.

Pressure flaps 19 are provided on the top edges of the end walls 13 and the side wall 12. When the cover member 15 is in a closed position with its locking tabs 17 inserted into the slit-like apertures 18 on the side wall 12 these pressure flaps 19 exert a resilient pressure upwardly on the bottom side of the cover member 15 and tend to urge it toward an open position. This resilient force against the bottom side of the cover 15 exerts a firm locking tension on the locking tabs 17 inserted in the slit-like apertures 18. This tight locking feature of the cover member 15 assures that the rodent feeder will be substantially tamper-proof; especially as regards being opened by children and pets.

Although the rodent feeder may be formed from any type of material, for economic reasons it is preferable that it be produced from fibre-board or similar inexpensive material. As may be seen in the drawings the box-like receptacle 10 is preferably formed from a single sheet of fibre-board which has been properly cut, folded and secured into a box-like structure.

The means within the receptacle 10 for dispensing dry, particulated rodenticidal compositions preferably comprises an insert I formed from a single sheet of fibreboard or similar material which has been folded in the proper manner to produce the structure shown in the drawings. This insert I comprises a rectangular floor portion 20 superimposed on and overlying the rectangular bottom portion 11 of the box-shaped receptacle 10, and a generally wedge-shaped self-feeding hopper shown generally at 21 for the automatic gravitational dispensing of a dry, particulated rodenticide. This wedge-shaped hopper comprises parallel opposed wedge-shaped side walls 22, a vertical back wall 23, and angularly disposed front wall 24 and a rectangular cover portion 25. The vertical back wall 23 is positioned in a face-to-face relation with one of the side walls; preferably 12.

An aperture 26 is provided in the rectangular cover portion 25 for filling the hopper with a dry, paarticulated rodenticidal composition. A dispensing aperture 27 is provided along the bottom edge of the angularly disposed front wall 24. The angular displacement and shape of the hopper 21 causes a gravitational flow of the rodenticidal composition to the aperture 27. When the hopper is substantially full the frictional resistance offered by the particulated rodenticide collected at the aperture 27 will prevent excess amounts of the rodenticide from being introduced onto the floor portion 20. However, as the rodenticide is removed or consumed by the rats or mice the rodenticide will work its way down the hopper under the influence of gravity to the aperture 27, thereby always presenting an ample supply of the rodenticidal mixture for consumption by rodents.

As shown in Figure 3 an aperture 28 is provided in the floor portion 20 of the insert. This aperture corresponds to the general shape and size of the base of a fount 29. The recess 28 retains the fount 29 in a snug fit fashion; preventing said fount from being upset.

The fount 29 is preferably formed from an inexpensive, non-corrosive metal such as galvanized sheet iron. However, if desired plastic, heavy waxed fibre-board or similar materials could be employed. The fount 29 is preferably of the self feeding gravitational form such as used in supplying water to chickens and the like and which is capable of receiving a reservoir such as a standard quart bottle or jar B for retaining a supply of a liquid rodenticidal composition. A fount of this type is highly desirable in that it is self feeding; holds a large supply of a liquid rodenticide; and requires little attention.

The rodent feeder of the instant invention is particularly adaptable to situations where rodenticidal compositions cannot be used openly or exposed, such as for example where small children or domestic pets are liable to consume or tamper with same. By the instant invention both dry and liquid rodenticides may be safely placed in open areas; the tight locking feature of the cover member 15 preventing or discouraging small children or pets from tampering with the rodent feeder. The outer surface of the cover member 15 may advantageously carry a legend or warning describing the poisonous contents of the receptacle. Accordingly, persons who are mature enough to easily disengage the locking tabs 17 would also be capable of understanding and appreciating the poisonous nature of the contents of the feeder from the warning legend printed on the top thereof.

Since the instant rodent feeder is preferably formed from fibre-board or a similar inexpensive material, cleaning and maintaining of same is no problem. That is, when the feeder has served its exterminating purposes or has reached a point where cleaning is necessary, it may be easily disposed of by burning or the like. If formed from metal or similar materials this practice would, of course, be financially prohibitive. The fount 29 for dispensing the liquid rodenticide may or may not be disposed of along with the feeder depending upon its initial cost and the purpose for which it is intended.

It will be appreciated by those skilled in the art that we have now provided a new and novel disposable rodent feeder for the dispensing of both dry and liquid rodenticidal compositions. It will also be appreciated by those skilled in the art that various modifications and changes may be effected without departing from the novel scope of the present invention.

We claim as our invention:

1. A disposable rodent feeder, comprising a generally box-shaped receptacle formed from a single sheet of fiberboard, said receptacle including a base portion, parallel opposed side and end walls and a cover member, said end walls having openings therethrough to permit the ingress and egress of rodents, said cover member having a free end edge and being hingeably engaged along its other edge to the top edge of one of said side walls, and adapted to be swingably closable to cover the top of said receptacle and to overlie the side wall opposite that side wall upon which said cover is hinged, means on the free end edge of said cover member cooperating with the adjacent side wall for locking said cover in a closed position, means for biasing said cover member upwardly and outwardly to assure a tight locking fit thereof, means within said receptacle including a hopper for gravitationally dispensing dry particulated rodenticidal compositions, and a fount for dispensing a liquid.

2. A disposable fiberboard rodent feeder for dispensing a particulated rodenticidal composition which comprises a box-shaped receptacle, said receptacle including a rectangular bottom portion, parallel opposed side and end walls, said end walls having apertures therethrough to permit the ingress and egress of rodents, a cover member having a free end edge and being hingeably engaged to the top edge of one of said side walls along its other end edge and adapted to cover the top of said receptacle and the side wall opposite that side wall upon which said cover is hinged, handle flaps on the side of said cover member for lifting and moving the rodent feeder, means defining slit-like apertures adjacent the bottom of the side wall opposite said side wall upon which said cover member is hinged, locking tabs on the free end edge of said cover member adapted for locking engagement in said slit-like apertures when said cover is in a closed position, pressure flaps on the top free edges of the end walls and said side wall opposite the side wall upon which said cover member is hinged adapted to exert a biasing pressure against the underside of said cover member when said cover member is in a closed position to resiliently bias said cover member toward an open position whereby locking tension is exerted on said locking tabs to insure a tight locking fit of said cover member on said box-shaped receptacle, means within said receptacle for automatically dispensing a dry particulated rodenticidal composition, and a self-feeding fount for dispensing a liquid.

3. In a disposable, substantially tamper-proof article for exterminating rodents, the combination of a box-like receptacle, and rodenticidial composition dispensing means therein, said box-like receptacle including a rectangular bottom portion, parallel opposed side and end walls, means defining openings to permit the ingress and egress of rats and mice through said end walls, a cover member, said cover member being hingeably engaged to the top edge of one of said side walls and adapted to be swingably closable to cover the top of said receptacle and overlie the side wall opposite that side wall upon which said cover member is hingeably engaged, means defining slit-like apertures on the side wall opposite that side wall upon which said cover member is hinged adjacent said rectangular bottom portion, locking tabs on the free end edge of said cover member adapted to make locking engagement in said slit-like apertures, pressure exerting means on the end walls and said side wall opposite the side wall upon which the cover is hinged for exerting a resilient pressure against the bottom side of said cover member to effect a strong locking engagement of said locking tabs within said slit-like apertures.

4. In a disposable, substantially tamper-proof rodent exterminating article of the class described, the combination of a box-like receptacle and means for dispensing a particulated rodenticidal composition within said receptacle, said receptacle including a rectangular bottom portion, opposed side and end walls, means defining openings through said end walls to permit the ingress and egress of rats and mice, a cover member hingeably engaged to one of said side walls adapted to be swingably closable to cover the top of said receptacle and overlie the side wall opposite that side wall upon which said cover member is hingeably engaged, flap-like extensions on the side edges of said cover member extending over said end walls providing handles for manipulating said receptacle while in use, means defining lock-tab receiving apertures on the side wall opposite that side wall upon which said cover member is hinged adjacent said rectangular bottom portion, locking tabs on the free end edge of said cover member adapted for locking engagement in said slit-like apertures, and pressure flaps for exerting an upward and outward resilient pressure against the bottom surface of said cover member to exert a tight locking force on said locking tabs in said slit-like apertures.

References Cited in the file of this patent

UNITED STATES PATENTS

| | | |
|---|---|---|
| 647,800 | Brown | Apr. 17, 1900 |
| 1,765,084 | Locke | June 17, 1930 |
| 2,359,341 | Weil | Oct. 3, 1944 |
| 2,596,087 | Shoudy | May 6, 1952 |
| 2,635,382 | Kuntz | Apr. 21, 1953 |